(12) United States Patent
Crigler

(10) Patent No.: US 6,370,099 B1
(45) Date of Patent: Apr. 9, 2002

(54) MINIATURE DISC DRIVE FOR NOTEBOOK COMPUTER

(75) Inventor: Robert Curtis Crigler, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/277,850

(22) Filed: Mar. 26, 1999

(51) Int. Cl.⁷ .............................. G11B 33/02; G06F 1/16
(52) U.S. Cl. ...................... 369/75.1; 361/683; 361/685
(58) Field of Search .............................. 369/75.1, 75.2, 369/77.1, 77.2, 78, 79; 360/97.01, 99.01, 99.02, 99.06; 361/679, 680, 681, 682, 683, 684, 685, 686, 724, 725, 726, 727

(56) References Cited

U.S. PATENT DOCUMENTS

| 5,243,495 A | * | 9/1993 | Read et al. | 361/685 |
| 5,572,399 A | * | 11/1996 | Shirato et al. | 361/680 |
| 5,701,230 A | * | 12/1997 | Liang et al. | 361/681 |
| 5,739,995 A | * | 4/1998 | Ohmi et al. | 360/137 |
| 6,208,506 B1 | * | 3/2001 | Pao | 361/683 |

FOREIGN PATENT DOCUMENTS

| JP | 62-209790 | * | 9/1987 | 369/79 |
| JP | 05-28734 | * | 2/1993 | |
| JP | 06-282976 | * | 10/1994 | |

* cited by examiner

*Primary Examiner*—David L. Ometz
(74) *Attorney, Agent, or Firm*—Andrew J. Dillon

(57) ABSTRACT

A notebook computer has a base with a pivotable display monitor. The base contains a disc drive for manipulating a disc, such as a CD or DVD. The disc drive has a manually-operated, rotating guard on a side edge of the base. Prior to the insertion of a disc, the guard is substantially retracted within the base. To load a disc into the disc drive, the guard is rotated about five degrees to a load/unload position and the disc is inserted into a slot. In the fully inserted position, approximately 1.5 to 2 inches of the disc will extend beyond the side edge of the base. The guard is rotated to its fully closed and locked position. Closing the guard causes the disc drive to engage and interface with the disc. The guard and the disc protrude from the side of the base during operation, but the disc is completely enclosed. The disc is removed by pushing an eject button and rotating the guard to its original position.

25 Claims, 2 Drawing Sheets

MINIATURE DISC DRIVE FOR NOTEBOOK COMPUTER

BACKGROUND OF THE INVENTION

1. Technical Field

This invention relates in general to recorded media disc drives and in particular to a miniature disc drive for notebook computers.

2. Background Art

Compact disc (CD) and digital video disc (DVD) drives for laptop or notebook computers are well known in the art. As the demand for smaller and smaller portable computerized machines such as notebook computers has increased, the size of their disc drives has become an increasingly important criteria in their design and layout. Since the x, y and z-dimensions for the CD and DVD are standardized by the industry, the continuing reduction in the size of disc drives has a finite limit. Existing designs are based on the assumption that he entire disc must be located within the volume of the case of the machine when the disc is being used. Recently, efforts to reduce the size of disc drives have focused on reducing the dimension or thickness of the drives. An improved CD and/or DVD drive for portable machines is needed to free up additional interior volume inside the machines for other devices.

SUMMARY OF THE INVENTION

A notebook computer has a base with a pivotable display monitor. The base contains a disc drive for manipulating a disc, such as a CD or DVD. The disc drive has a manually-operated, rotating guard on a side edge of the base. Prior to the insertion of a disc, the guard is substantially retracted within the base. To load a disc into the disc drive, the guard is rotated about five degrees to a load/unload position and the disc is inserted into a slot. In the fully inserted position, approximately 1.5 to 2 inches of the disc will extend beyond the side edge of the base. The guard is rotated to its fully closed and locked position. Closing the guard causes the disc drive to engage and interface with the disc. The guard and the disc protrude from the side of the base during operation, but the disc is completely enclosed. The disc is removed by pushing an eject button and rotating the guard to its original position.

BEST MODE FOR CARRYING OUT THE INVENTION

Figure 1:
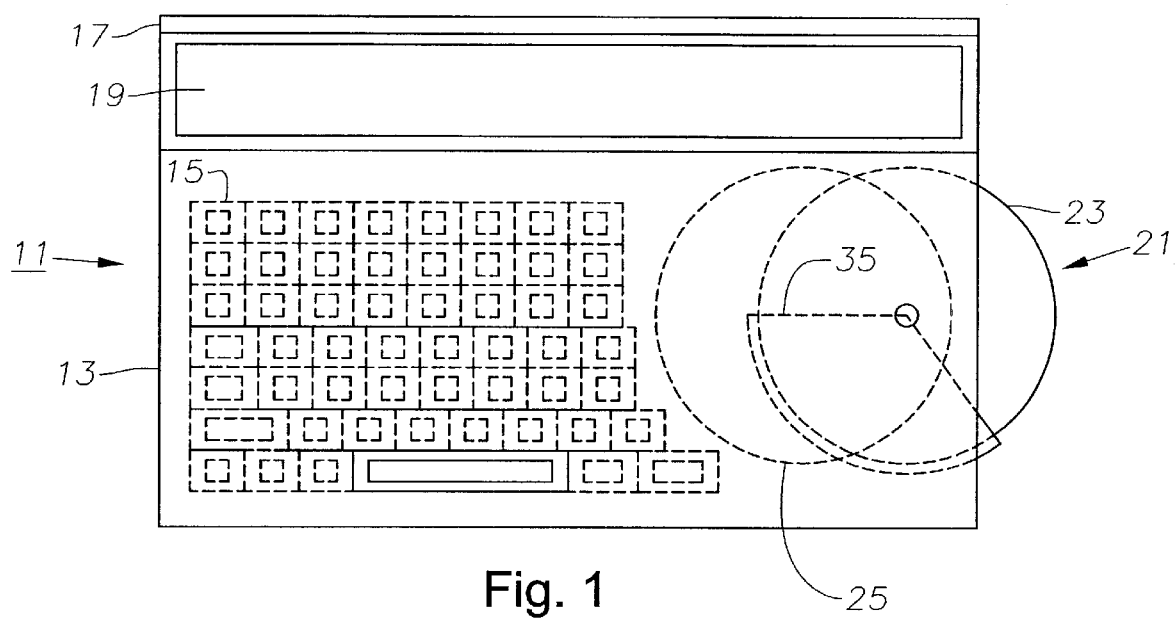
FIG. 1 is a schematic top view of a notebook computer having a disc drive is constructed in accordance with the invention.

Referring to FIG. 1, a notebook computer 11 having a substantially horizontal base 13 with a keyboard 15 on an upper surface is shown. Base 13 contains a variety of electrical components for performing computing functions such as those that are commonly known in the computer arts. The lower edge of a lid 17 is pivotally mounted near the upper rearward edge of base 13. Lid 17 contains a display monitor 19 and is shown in a substantially upright or open position relative to base 13. Lid 17 also may be pivoted to a closed position wherein it is adjacent and substantally parallel to base 13 (not shown).

Base 13 contains a disc drive 21 for manipulating a disc 23 (shown in dashed lines) having recorded media, such as a CD or DVD. FIG. 1 also illustrates the typical position of a disc 25 (shown in dotted line) in a conventional disc drive (not shown) when disc 25 is loaded into a prior art disc drive. Note that disc 23 is located approximately 1.5 to 2 inches to the right of disc 25 such that a portion of disc 23 extends beyond the periphery or side edge of base 13. This is the actual operational position for disc 23; it does not tact within base 13. Although drive 21 is shown located adjacent to the right side edge of base 13, it may be located anywhere on computer 11. When disc 23 is loaded in drive 21, it mounts to a rotatable spindle 27. The distance from the center of spindle 27 to the right side edge of base 13 is less than the length of the radius of disc 23.

Referring now to FIGS. 2–5, disc drive 21 has a pair of elongated rectangular doors 31, 33 on the right side edge of base 13. Doors 31, 33 are very similar to PCMCIA doors and are pivotally actuated along their upper and lower edges, respectively. When disc drive 21 is not in use (FIG. 4), doors 31, 33 are vertically aligned in a closed position. When disc drive 21 is in use (FIGS. 2, 3 and 5), doors 31, 33 are pivoted 90 degrees into base 13 and are horizontally disposed in an open position. In the preferred embodiment, doors 31, 33 separate and create a long rectangular slot 34 in base 13 that is approximately ⅛ inch wide and slightly longer than the diameter of a CD. Disc drive 21 contains an internal disc retaining or clamping mechanism (not shown) for securing disc 23 during operation.

Figures 2, 3:
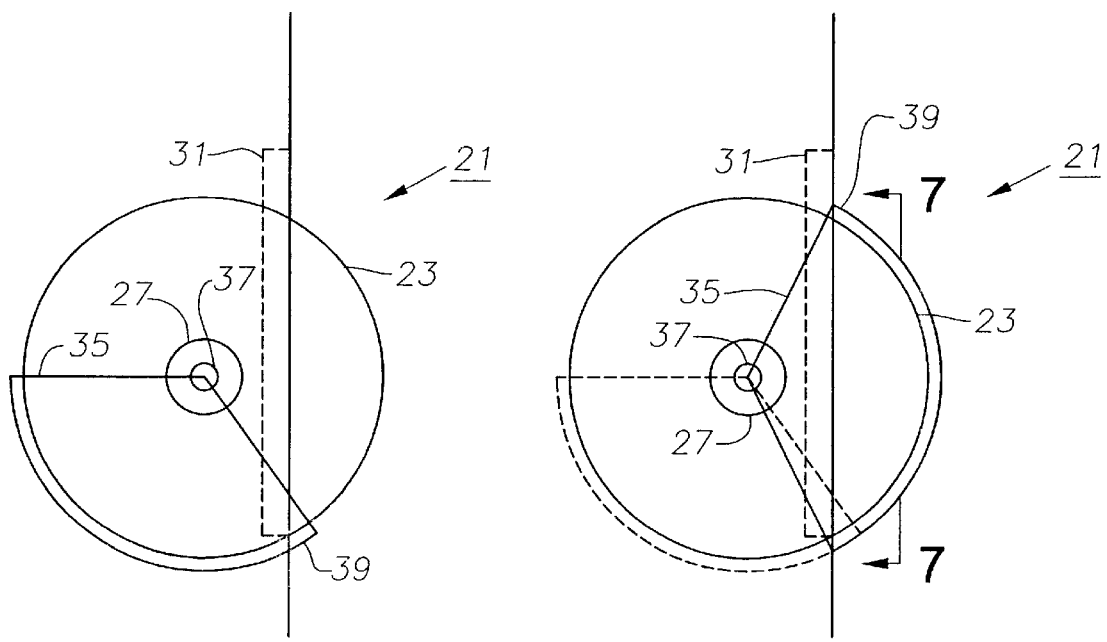
FIG. 2 is an Wenrg schematic top view of the computer and disc drive of FIG. 1 loaded with a disc but prior to use.
FIG. 3 is an enlarged schematic top view of the computer and disc drive of FIG. 1 in operation.
Figure 7:
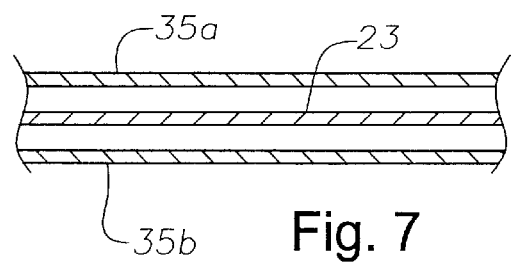
FIG. 7 is a sectional side view of the disc and an enclosure taken along the line 7—7 of FIG. 3.

Disc drive 21 also comprises a manually-operated enclosure or guard 35 which is arcuate in shape and spans approximately 130 degrees when viewed from above. Guard 35 is pivotable relative to base 13 and disc 23 about a central pivot point 37. As shown in FIG. 7, guard 35 has thin upper and lower walls 35a, 35b which define a cavity between. Walls 35a, 35b surround but do not touch disc 23, the exposed portion of which is located in the cavity. Guard 35 also has a convex outer edge (FIGS. 4 and 5) when viewed from the side. The leading edge of guard 35 acts as a handle 39 (FIGS. 2 and 4) for manipulation by the user. Guard 35 has a retracted open position (FIGS. 1, 2 and 4), and an extended or locked position (FIGS. 3 and 5). As will be described in further detail below, doors 31, 33 and linked to guard 35 and move in response to the rotation of guard 35 by the user.

Figure 4:
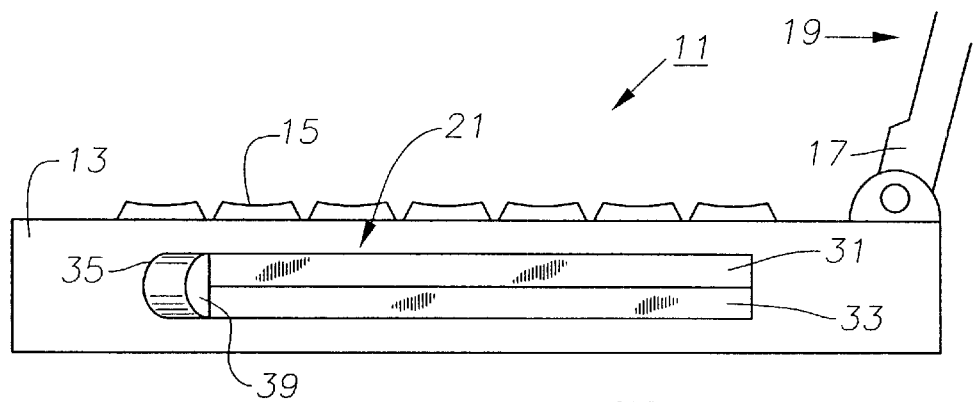
FIG. 4 is a side view of the computer and disc drive of FIG. 1.
Figure 5:
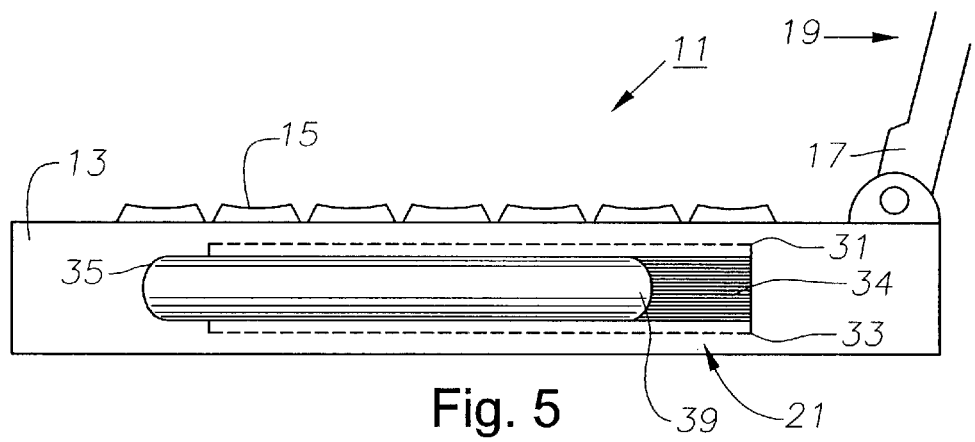
FIG. 5 is a side view of the computer and disc drive of FIG. 3 in operation.

In operation and prior to the insertion of a disc 23, doors 31, 33 are closed and guard 35 is retracted within base 13 such that only handle 39 is exposed (FIG. 4). To load a disc 23 into disc drive 21, handle 39 and guard 35 are manually rotated out of base 13 about 5 degrees (counterclockwise when viewed from above) to its load/unload position. A "click" will be made by guard 35 at this point as an audible indicator for the user. This motion actuates doors 31, 33 into their open positions and prepares the disc clamping mechanism (not shown) for entry of disc 23. Disc 23 is then inserted into slot 34. An internal disc guide mechanism (not shown) may be used to facilitate entry and proper alignment. After disc 23 is fully inserted (FIG. 2), guard 35 is manually rotated to its fully extended position FIGS. 3 and 5) and "clicked" to a locked position. In this position, guard 35 envelopes the exposed portion of disc 23 located outside of base 13.

This exposed portion is located between the upper and lower walls 35a, 35b of guard 35.

Guard 35 has a range of motion of approximately 130 degrees between its retracted and locked positions. This additional motion causes the disc clamping mechanism to engage disc 23 and begin operation. Disc 23 and guard 35 will extend from the side of base 13 about two inches while the disc drive 21 is in use, although disc 23 is completely enclosed.

To remove disc 23, computer 11 is equipped with an eject button (not shown) on base 13 adjacent to guard 35. When the sect button is depressed, guard 35 is unlocked and springs open slightly, about 5 degrees. The disc clamping mechanism disengages disc 23 and operation of disc drive 21 ceases when the eject button is actuated. Handle 39 and guard 35 are then manually rotated back into base 13 (clockwise when viewed from above) so that disc 23 is exposed once again. Guard 35 should only be rotated to the load/unload position (about 5 degrees from its fully retracted position). Again, guard 35 will make an audible signal to the user to indicate this position. Disc 23 may now be removed. To shut down disc drive 21 and close doors 31, 33, guard 35 is rotated to its fully retracted position.

Figure 6:
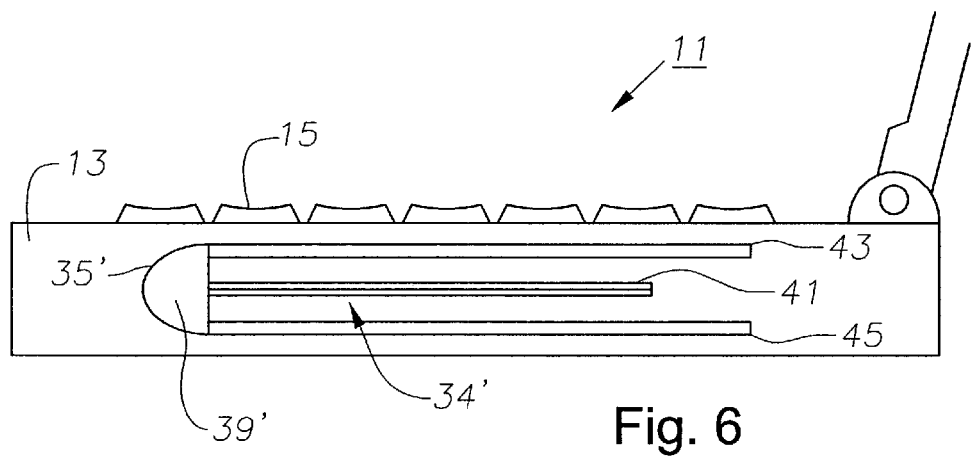
FIG. 6 is a side view of an alternate configuration of the computer and disc drive of FIG. 1.

An alternate configuration for closing disc drive 21 is shown in FIG. 6. In this version, slot 34' is only slightly wider than the thickness of disc 23. Slot 34' may also be fitted with soft but resilient wiping strips 41 instead of doors 31, 33. Curved guard 35' operates in the same manner as before, but its upper and lower walls slidably rotate through thin slots 43, 45, respectively, which are parallel to slot 34'. The operation of disc drive 21 is otherwise identical.

The invention has several advantages. By extending a portion of the disc beyond the perimeter of the computer, an extra one to two cubic inches of disc drive volume are eliminated. This extra space simply may be used to reduce the overall size of the computer, utilize by other equipment, or for other purposes.

While the invention has been shown or described in only some of its forms, it should be apparent to those skilled in the art that it is not so limited, but is susceptible to various changes without departing from the scope of the invention.

I claim:

1. An apparatus, comprising:
    a housing having a perimeter wall;
    a plurality of electrical components located within the housing for performing computing functions;
    a user interface mounted to the housing for allowing a user to interface with the electrical components;
    a drive device mounted inside the housing for manipulating recorded media with respect to the electrical components;
    an opening in the perimeter wall adjacent to the drive device for receiving and removing the recorded media from the drive device; wherein
        the drive device is positioned relative to the perimeter wall such that when the recorded media is loaded into the drive device, an exposed portion of the recorded media extends out of the opening beyond the perimeter wall of the housing; and wherein the apparatus further comprises:
    a guard mounted to the housing, the guard having a retracted position substantially retracted within the housing and an extended position wherein the guard is adapted to enclose the exposed portion of the recorded media which extends beyond the perimeter wall of the housing.

2. The apparatus of claim 1 wherein the apparatus comprises a notebook computer.

3. The apparatus of claim 1 wherein the user interface comprises a keyboard and a visual display monitor.

4. The apparatus of claim 1 wherein the drive device comprises a disc drive for rotating and interfacing with media discs having recorded media.

5. The apparatus of claim 1 wherein the guard is pivotally mounted to the housing for rotational movement into and out of the housing.

6. A The apparatus of claim 1 wherein the guard has parallel top and bottom walls which are spaced apart from one another to define a cavity, the cavity being adapted to envelop the exposed portion of the recorded media.

7. The apparatus of claim 1 wherein the guard is arcuate in shape to conform to an arcuate edge of the recorded media.

8. A computer, comprising:
    a base having front, rear and side edges which define a perimeter;
    a disc drive having a spindle and mounted in the base for manipulating a disc;
    an opening in one of the edges of the base for inserting and removing the disc from the disc drive; wherein
        the disc drive is positioned adjacent to the opening so that when the disc is loaded into the disc drive, an exposed portion of the disc extends out of the opening; and
    a guard mounted to the base, the guard having a retracted position substantially retracted within the base and an extended position wherein the guard is adapted to enclose the exposed portion of the disc which extends beyond the perimeter of the base.

9. The computer of claim 8 wherein the disc drive is adapted to extend the disc out of the opening by at least one inch.

10. The computer of claim 8 wherein the computer is a notebook computer having a keyboard on an upper surface, a lid pivotally mounted to the base and having open and closed positions, and a display monitor located in the lid for viewing by a user.

11. The computer of claim 8 wherein the guard is pivotally mounted to the base for rotational movement into and out of the base.

12. The computer of claim 8 wherein the guard has parallel top and bottom walls which are spaced apart from one another to define a cavity, the cavity being adapted to envelop the exposed portion of the disc.

13. The computer of claim 8 wherein the guard is arcuate in shape to conform to an arcuate edge of the disc.

14. The computer of claim 8 wherein the guard is manually operable between the retracted and extended positions.

15. The computer of claim 8 wherein the guard is rotatable about a pivot point from the retracted position to a load/unload position while the disc is being loaded and unloaded, and further rotatable to the extended position to operate the disc drive.

16. The computer of claim 15 wherein the guard is rotated approximately five degrees from the retracted position to move the guard to the load/unload position.

17. The computer of claim 15 wherein the guard is rotated approximately 130 degrees to move between the retracted and extended positions.

18. The computer of claim 9 wherein a distance from the spindle to the perimeter is less than a length defined by a radius of the disc.

19. A notebook computer, comprising:

a base having front, rear and side edges which define a perimeter and an opening in one of the edges for inserting and removing a disc;

a keyboard on an upper surface of the base;

a lid pivotally mounted to the base and having open and closed positions;

a display monitor located in the lid for viewing by a user;

a disc drive having a central spindle and mounted in the base adjacent to the opening such that, when the disc is loaded into the disc drive, an exposed portion of the disc extends out of the opening beyond the perimeter of the base; and an arcuate guard pivotally mounted to the base adjacent to the opening and having parallel top and bottom walls which are spaced apart from one another to define a cavity, the cavity being adapted to envelop the exposed portion of the disc, the guard further having a refed position substantially retracted within the base and an extended position wherein the guard is adapted to enclose the exposed portion of the disc which extends beyond the perimeter of the base.

20. The computer of claim 19 wherein the disc drive is adapted to extend the disc out of the opening by at least one inch.

21. The computer of claim 19 wherein the guard is manually operable between the retracted and extended positions.

22. The computer of claim 19 wherein the guard is rotatable from the retracted position to a load/unload position while the disc is being loaded and unloaded, and further rotatable to the extended position to operate the disc drive.

23. The computer of claim 22 wherein the guard is rotated approximately five degrees from the retracted position to move the guard to the load/unload position.

24. The computer of claim 19 wherein the guard is rotated approximately 130 degrees to move between the retracted and extended positions.

25. The computer of claim 19 wherein a distance from the spindle to the perimeter is less than a length defined by a radius of the disc.

* * * * *